United States Patent [19]

O'Farrell et al.

[11] 4,072,648

[45] Feb. 7, 1978

[54] HIGH TENSILE STRENGTH ELASTOMERIC ADHESIVE CEMENTS AND LAMINATES THEREFROM

[75] Inventors: Charles P. O'Farrell, Clark; John J. Higgins, Westfield, both of N.J.

[73] Assignee: Exxon Research & Engineering Co., Linden, N.J.

[21] Appl. No.: 505,341

[22] Filed: Sept. 12, 1974

Related U.S. Application Data

[62] Division of Ser. No. 209,414, Dec. 17, 1971, Pat. No. 3,867,247.

[51] Int. Cl.$^2$ .......................... C08K 5/01; C08K 5/05; C08K 5/15; C08L 9/00
[52] U.S. Cl. .................. 260/33.4 PQ; 260/27 BB; 260/303.4 A; 260/33.6 A; 260/79.3 A; 260/846; 260/888
[58] Field of Search ................. 260/33.4 R, 33.4 PQ, 260/33.6 A, 846, 79.3 R, 27 BB, 30.4 A, 888

[56] References Cited

U.S. PATENT DOCUMENTS

| | | | |
|---|---|---|---|
| 3,484,405 | 12/1969 | Seto | 260/33.6 A |
| 3,642,728 | 2/1972 | Canter | 260/79.3 R |
| 3,801,531 | 4/1974 | Berejka et al. | 260/846 |

*Primary Examiner*—Allan Lieberman
*Attorney, Agent, or Firm*—A. Lagani; John J. Mahon

[57] ABSTRACT

Adhesive contact cements of sulfonated olefinically unsaturated elastomers (sulfobutyl rubber) containing from about 0.1 to about 5.0 mol % SO$_3$H neutralized, partially neutralized, or unneutralized, are admixed with tackifiers, i.e. phenolformaldehyde resins, polyisobutylene, alkylphenol formaldehyde resins, petroleum resins, etc. in an amount of between about 5 and about 90 phr in between about 10 and about 50 wt. % solids concentration in organic solvents. These cements are used for adhering porous or non-porous materials such as textiles, wood, cloth, sheets or strip of metals, plastics, etc. to each other. High green strength, high tensile strength, high resistance to peel, even at elevated temperatures, water impermeability, etc. characterize such adhesive layers in laminates. A preferred solvent, 90% toluene, 10% isopropyl alcohol is used in compounding the cement and preferably an organic amine, e.g. ethylamine, is used to partially or completely neutralize the sulfonated elastomer although inorganic bases may also be used for neutralization.

7 Claims, No Drawings

HIGH TENSILE STRENGTH ELASTOMERIC ADHESIVE CEMENTS AND LAMINATES THEREFROM

This is a division of application Ser. No. 209,414, filed Dec. 17, 1971, now U.S. Pat. No. 3,867,247, issued Feb. 18, 1975.

DESCRIPTION OF THE INVENTION

This invention relates to high tensile strength elastomeric adhesive cements and to laminated substrates employing such cements as the adhesive layer holding the substrates to each other in laminated form. Elastomers such as natural rubber or synthetic elastomers such as butyl rubber, halobutyl rubber, or other olefinically unsaturated elastomers such as SBR, polyisoprene, polybutadiene, polychloroprene, ethylene-diene propylene terpolymers, are curable by cross linking or otherwise being vulcanized. The most general method of vulcanization of such materials involves the use of sulfur and sulfur compounds. However, chemical (peroxide) vulcanization is also utilized in many instances.

Sulfonic acid polymers and copolymers of such elastomers have been prepared in the past by well known methods, for example, aromatic containing polymers are sulfonated as described in U.S. Pat. No. 3,072,618 using a complex of a lower alkyl phosphate and sulfur trioxide. Water soluble polymers have been prepared by reacting the aromatic rings in styrene-butyl rubber graft polymers with $SO_3$ to form viscous sulfonated products as described in Soviet Pat. No. 211,079. The olefinically unsaturated elastomers, including natural rubber as well as the synthetic elastomers, have been sulfonated using chlorosulfonic acid with ethers and esters as described in German Pats. Nos. 582,565, 550,243 and 572,980. U.S. Pat. No. 3,205,285 teaches that the ability to take up dyes in the case of polypropylene fibers is enhanced by reacting the fibers with an $SO_3$ complex.

More recently sulfonated elastomers have been prepared of particular sulfo-group content by the reaction of the natural or synthetic elastomers using various complexes of $SO_3$. This is described, in detail, in pending U.S. Patent Application 877,849, filed Nov. 18, 1969, which has issued as U.S. Pat. No. 3,642,728 issued Feb. 15, 1972. This disclosure is incorporated herein by reference since the sulfonated products produced as described in that patent are one type of useful sulfonated elastomers forming the chief component of the contact cements hereinafter described. Additionally, another method of producing the sulfonated elastomers again of limited mole % sulfo group content and having unique properties are prepared by the reaction of the olefinically unsaturated rubbers with acyl sulfate. These sulfonated elastomers differ to some extent chemically from those described in the last mentioned U.S. patent, but in general both types of sulfonating techniques have been used to prepare sulfonated butyl rubbers which exhibit high green strengths, high tensile strengths, which have a high water impermeability and which possess other advantageous properties not heretofore present in previously produced sulfonated elastomers. The method of preparation of these sulfonated elastomers using acyl sulfates is described in pending U.S. Application Ser. No. 123,908, filed Mar. 12, 1971 by O'Farrell and Serniuk and now abandoned, which disclosure is incorporated hereinto by reference.

The rubbers which may be sulfonated are the olefinic and unsaturated elastomers such as butyl rubber, halogenated butyl rubber, ethylene-propylene-conjugated or non-conjugated diolefin terpolymers, polyisobutylene, styrene-butadiene rubbers, polybutadiene, polyisoprene, natural rubber and the various types of heretofore well known rubbers containing either high or low olefinic unsaturation. The copolymerization of ethylene or propylene, with multiolefin such as hexadiene, dicyclopentadiene, norbornadiene, methylene norbornene, ethylidene norbornene, 1,5-cyclooctadiene, etc. are useful elastomers as starting materials for sulfonation. Generally these polymers contain between 0.2 and about 10.0 mole % unsaturation. As used herein, the term "olefinically unsaturated" is not intended to refer to aromatic type unsaturation but to the aliphatic or cycloaliphatic type of unsaturation. Butyl rubber and halobutyl rubber are well known articles of commerce. In general, they have a viscosity average molecular weights, Mv, ranging between about 300,000 and 450,000. They are prepared conventionally as described in U.S. Pat. Nos. 2,356,128 and 3,099,644. Lower molecular weight butyl rubbers may also be prepared having Mv of between about 30,000 and about 100,000. The methods of producing these low molecular weight butyl rubbers are described in U.S. Pat. No. 3,562,804. The corresponding chloro- or bromobutyl rubbers of low molecular weight may also be prepared in conventional manner as described in U.S. Pat. No. 3,104,235. For most purposes, the low molecular weight rubbers are not used alone but may be blended with the higher molecular weight rubbers in order to give a calculated averaged viscosity average molecular weight intermediate between the high and low molecular weight rubbers, depending upon the properties desired in the adhesives to be produced and the specific uses for which they are intended.

The sulfonation, using either the $SO_3$-complex described in the aforementioned U.S. Patent issued to Canter or the acyl sulfates described in Application Ser. No. 123,908, filed Mar. 12, 1971 and now abandoned, is carried out so as to give a final sulfo rubber containing between about 0.1 and 5.0 mole % $SO_3H$ groups. The reactants, amounts of reactants, and the reaction conditions are fully set forth in the Canter patent and the pending application and are incorporated herein by reference.

Additionally, blends or admixtures of butyl rubber with natural rubber, of butyl rubber or chlorobutyl rubber with SBR, etc. may be employed as the elastomeric components to be sulfonated. Similarly, in preparing the combined cement hereinafter more fully described, previously, and separately, sulfonated elastomers may be blended, after sulfonation, and, lastly, admixtures of sulfonated elastomers with unsulfonated elastomers may be formed into blends and used in the hereinafter described combined cements. As previously pointed out, mixtures, or blends of rubbers of differing molecular weight may be incorporated in order to give a balanced intermediate viscosity average molecular weight to the final blend which is suitable for certain desired purposes because of the intermediate physical properties of the blend in contrast to that of the individual components of the blend.

The novel adhesive elastomeric contact cement compositions are prepared, using as the base of the cement composition, the heretofore described sulfo derivatives of the olefinically unsaturated elastomers, in which the amount of sulfo groups ranges between about 0.1 and about 5.0 mole %, preferably between about 0.5 and about 2.0 mole %.

Additionally one of the more important components of the laminated cement are the tackifiers. These are well known materials which have heretofore been used to give tackiness and adhesion to various elastomers. Not all types of tackifiers are suitable in the instant composition but all of the glassy organo thermoplastic resins having softening or melting points above 50° C. have been found to be satisfactory in the instant novel cement composition. In general, these are well known commercially available materials sold under various trademarks used as tackifiers in the rubber compounding industry, and are generally selected from the following specific classes:

alkyl phenol-formaldehyde resins
    phenol-formaldehyde resins
    petroleum hydrocarbon resins
    chlorinated biphenyls
    rosin-pentaerythritol resins
    coumarone-indene resins
    polyterpene resins, and similar thermoplastic materials. These are employed in amounts ranging between about 5 and 90 parts phr (per hundred parts of rubber). Preferably they are employed in amounts ranging between about 30 and about 60 parts phr.

Fillers of conventional type are also utilizable to give added body to the ultimate laminate adhesives layer. These may be talcs, clays, calcium carbonates, carbon blacks, silicas, and the like. They are generally used optionally and, if used, are present in amounts ranging between about 5 and 50 parts phr.

The solvents employed are generally of the organic type or they are of the mixed solvent type in which at least one of the solvents is a polar solvent. The strictly organic hydrocarbon type solvents may be benzene, toluene, tetrahydrofuran, or other similar types. On the other hand, mixed solvents generally give better cements because of their solvation characteristics. Such solvents may be branched chain alcohols, i.e. a polar solvent, or dioxane, coupled with cyclohexane, benzene or toluene or coupled with tetrahydrofuran. These provide excellent cements having stability on standing. Any other suitable solvents, customarily employed in forming elastomeric cements, which are, in fact, solvents for the concentration of the sulfo elastomers incorporated, may also be employed. For the most part, this selection of the organic solvent or mixed solvents forming the cement is a matter of choice and convenience. It should be understood, however, that the solvent, or mixed solvents, employed do, in fact, possess sufficient volatility characteristics so that, once a laminate is formed, substantially all of the solvents are evaporated at ambient temperatures and pressures within a reasonable length of time, i.e. a matter of 1–24 hours, since it is desired that the adhesive bonding layer be substantially devoid of solvent once the laminate has reached a static condition. In general, the cements will contain between about 10 and about 50 wt. % total solids, preferably between about 15 and about 25 wt. % total solids. A preferred solvent consists of 90 parts by weight of toluene admixed with 10 parts by weight of isopropyl alcohol.

Also the sulfonated elastomers employed may be incorporated into the cements in an unneutralized (acidic) form. Best results, however, have been attained where the sulfo groups have been at least partially neutralized, preferably, completely neutralized. The neutralizing agents employed may be any inorganic or organic base such as for example the alkali metal or alkaline earth metal hydroxides or carbonates, for example, potassium hydroxide, sodium hydroxide, calcium hydroxide, sodium carbonate, potassium carbonate, calcium or barium carbonate, etc. The organic bases which are generally employed are the amines. These are either the mono-, di- or triamines. They may be heterocyclic, alicyclic, or aliphatic, in nature, and they may contain polar groups as well. Specific examples of the amines that may be employed are methylamine, dimethylamine, trimethylamine, ethylamine, diethylamine, triethylamine, n-butylamine, di-n-butylamine, tri-n-butylamine and in fact any mono, di, or tri ($C_1$–$C_8$ alkyl) amine. Examples of heterocyclic amines that may be employed are pyridine, piperazine, and pyrolidine. Examples of amines containing polar groups which have been found to be satisfactory are the alkylol amines such as mono-, di- or triethanol amine and nitrilo-tri-acetic acid. Other amines containing other polar groups such as chlorine, carbonyl and ether groups may also be used in addition to those containing hydroxyl and carboxyl groups. It is preferred to neutralize the sulfo groups with an amine of these types, preferably, ethylamine. Surprisingly, improved results are attained when all of the sulfo groups have been neutralized with an amine.

Various types of substrates to which the cements are adhered are either of the porous or non-porous type and they may be either organic or inorganic in nature. The surfaces to be adhered to one another by means of the adhesive contact cement are merely sprayed, brushed, dipped or otherwise coated with the cement to a thickness of from about 1 to 15 mils, after which they are contacted with one another under mild pressure for a sufficient length of time to allow the solvent of the cement to vaporize therefrom leaving the solid material in place as the intermediate layer of the laminate. The various types of materials used as substrates are as follows:

Porous materials such as, textile fibers, cloth of cotton, wool, silk or synthetic fibers such as polyesters, nylon, paper, wood, paperboard, and the like and non-porous materials such as strips or sheetings of polystyrene, polyurethane, cellophane, polypropylene, polyethylene, polyester Mylar, cellulose acetate and sheet metals such as strips or sheets of aluminum, copper, steel, etc. In order to illustrate the general character of the invention, the following are given as examples but it is not intended that the invention be limited thereto.

EXAMPLE 1

Two butyl cements in normal hexane (3 liters) each containing 14.2 wt. % solids (butyl rubber of Mv 350,000) were each reacted with 8.24 cc and 16.48 cc, respectively of an acetyl sulfate solution. The acetyl sulfate solution was made up by reacting 23.4 mls of acetic anhydride with 11 mls of 96% sulfuric acid. The two cements were separately neutralized with stoichiometric amounts of ethylamine (70% in $H_2O$) and 0.6 grams of phenyl-beta-naphthylamine was added as an antioxidant. The polymers were then steam stripped, and hot mill dried. Polymer #1 contained 0.7 mole % of $SO_3^-EA^+$ (ethylamine) and polymer #2 contained 1.5 mole % of $SO_3^-EA^+$ (ethylamine).

EXAMPLE 2

Polymer #2 of Example 1, containing 1.5 mole % of ethylamine fully neutralized SO$_3$H groups, was dissolved at 20 wt. % total solids in a 90-10 toluene-isopropyl alcohol solution. It had a Brookfield solution viscosity of 7000 cps. A cast, dried film of this cement, 6 mills thick, exhibited a tensile strength of 3850 lbs. per square inch and an elongation at break of 1050%. This cement was used to laminate cotton duck cloth to cotton duck cloth, cotton duck cloth to steel, and polypropylene film to polypropylene film. Adhesion of these substrates was measured by an Instron Peel test measurement at a pull rate of 2 inches/min. at 72° F. In the case of the cotton duck cloth laminated to cotton duck cloth, the T-peel adhesion measured on the Instron tester was 25–30 psig. In the case of the cotton-duck cloth adhering to the steel panel the 180° peel adhesion was 3 psig and in the case of the polypropylene film laminated to polypropylene film, the T-peel adhesion was 1 psig.

EXAMPLE 3

747 grams of butyl rubber of Mv 350,000 was dissolved in hexane to the extent of 16.7 wt. % solids and was placed in a 5 liter flask equipped with a stirrer. 6.25 cc of acetyl sulfate, prepared as per Example 1, was added to the cement and reacted for 30 minutes at ambient temperatures. 50 cc of isopropyl alcohol and 0.25 grams of an antioxidant, 2.6 di-tert-butyl-4-methylphenol were added. The cement was used in this acid form for adhesion tests.

EXAMPLE 4

The sulfo butyl polymer cement described in Example 3 was applied to substrates, laminated, dried and tested on an Instron tester at room temperature. A laminate was prepared of cotton duck cloth to cotton duck cloth with an intermediate layer of the aforementioned cement in its free acid form. It had a T-peel adhesive strength of 15 psig when pulled, as in Example 2, at 2 inches per minute on the Instron Tester.

The sulfobutyl polymer cement of Example #3 was fully neutralized with ethylamine. This fully neutralized cement was used to laminate cotton duck cloth to cotton duck cloth, as described above. It had a T-peel strength under the same conditions of 16 psig.

In contrast, a control sample of unsulfonated butyl rubber cement when used to laminate cotton duck cloth and tested, in the same manner, gave a T-peel strength at only 6 psig.

The unneutralized sulfobutyl cement of Example 3 was used to laminate cotton duck cloth to sheets of steel. This laminate was dried and tested in an 180° peel test at 2 inches/min. on an Instron Tester at room temperature and yielded an adhesive strength of 3.5 psig. This unneutralized sulfobutyl polymer cement was then fully neutralized with ethylamine. This fully neutralized cement was also used to laminate cotton duck cloth to sheets of steel, as described above. It had a 180° peel strength, under the same conditions of 0.2 psig. In contrast, a control sample of unsulfonated butyl rubber cement when used to laminate cotton duck cloth to sheets of steel and tested in the same manner gave a 180° peel strength of zero psig.

EXAMPLE 5

100 parts of sulfobutyl rubber of Mv 350,000 containing 1.5 mole % of sulfonic acid groups, fully neutralized, partially neutralized, and in the free acid form were admixed with 45 parts per hundred parts of rubber of Wingtack 95 (a petroleum hydrocarbon resin with a softening point of approximately 95° C.) and dissolved to the extent of approximately 25 wt. % solids in a mixture of 90 parts toluene and 10 parts of isopropyl alcohol. Each of these three cements were applied to substrates in a thickness of approximately 5 mils. The substrates were immediately laminated and dried at 23° C. for 24 hours and then tested on an Instron tester at room temperature at a rate of 2 inches per minute.

TABLE I

| Polymer | T-Peel Cotton Duck-Cotton Duck lbs/in. | 180° Peel Cotton Duck-Steel lbs./in. |
|---|---|---|
| Sulfobutyl, 1.5 mol. % fully neutralized with ethylamine | 24 | 3.0 |
| Sulfobutyl, 1.5 mol. % .35/1 partially neutralized with ethylamine | 23 | 1.5 |
| Sulfobutyl, 1.5 mol. % unneutralized | 18 | 6.8 |

EXAMPLE 6

In order to demonstrate the highly desirable properties of retention of strength and adhesion under conditions of elevated temperatures, a sulfobutyl rubber substantially identical with that produced in Examples 1 and 3 but fully neutralized with sodium hydroxide instead of ethylamine was compared with an SBR Block copolymer (Kraton 1101) as a gum polymer film. These films had the following tensile strengths under the following temperature conditions.

TABLE II

| Samples prepared from 20 Mil thick molded pads, tested on an Instron at 20/in/min. | Sulfobutyl, 2 Mole % SO$_3$Na, Fully neutralized | SBR Block Copolymer(Kraton 1101) |
|---|---|---|
| Tested at 25° C. | | |
| Tensile Strength, psi | 3000 | 3900 |
| Elongation, % | 800 | 550 |
| Tested at 50° C. | | |
| Tensile Strength, psi | 2200 | 2000 |
| Elongation, % | 850 | 1500 |
| Tested at 75° C. | | |
| Tensile Strength, psi | 2000 | 400 |
| Elongation, % | 1000 | 1150 |
| Tested at 100° C. | | |
| Tensile Strength, psi | 1800 | 80 |
| Elongation, % | 1100 | 150 |

A similar sulfobutyl rubber having 1.5 actual mole % SO$_3$H groups, but fully neutralized with ethylamine, in a cement of 90-10 toluene-isopropyl alcohol to the extent of 20 wt. % total solids was applied separately to two cotton duck cloth substrates, laminated, dried at room temperature for a period of 24 hours and tested for its adhesion strength on an Instron tester at 2 inches per minute under varying temperature conditions. The following T-Peel strengths were obtained, at the temperatures indicated in Table III.

TABLE III

| T-Peel, lbs/inch Cotton Duck - Cotton Duck | |
| --- | --- |
| Tested at 25° C. | 25 |
| Tested at 35° C. | 24 |
| Tested at 50° C. | 26 |
| Tested at 100° C. | 18 |

EXAMPLE 7

Sulfobutyl rubber of 1.5 mole % $SO_3H$, either fully neutralized with ethylamine, or in the free acid condition, was dissolved in a 90/10 mixture of toluene/isopropyl alcohol (IPA) (20 wt. % solids). Wingtack 95 (a petroleum hydrocarbon resin with a softening point at approximately 95° C.) or Amberol ST-137X (a phenol-formaldehyde resin with a melting point of approximately 70° C.) was used as a tackifier in the amount of 60 phr level in these cements. These cements at solids thickness of about 5 mils were used as the adhesive layer to laminate layers of cotton duck cloth to cotton duck cloth. The Cotton duck laminates were tested in a T-peel adhesion test at the rate of 2 inches per minute at various temperatures with the results shown in Table IV.

TABLE IV

Cements applied to substrates, laminated, dried and tested as described. Adhesion pulled on an Instron at 2 in./min

| Compounds | A | B | C |
| --- | --- | --- | --- |
| Sulfobutyl, 1.5 mol %, $SO_3EA$ fully neutralized | 100 | 100 | — |
| Sulfobutyl, 1.5 mol %, $SO_3H$ unneutralized | — | — | 100 |
| Wingtack 95 resin | 60 | — | — |
| Amberol ST-137 X resin | — | 60 | 60 |
| Solvent, Toluene/IPA, 90/10 | | | |
| T-Peel, lbs./in. Cotton Duck-Cotton Duck | | | |
| Pulled at 22° C. | 28 | 16 | 21 |
| Pulled at 60° C. | 26 | 13 | 12 |
| Pulled at 80° C. | 16 | 9 | 10 |
| Pulled at 105° C. | 11 | 2.5 | — |

The data appearing in Tables II, III and IV amply demonstrate that sulfobutyl adhesive systems show good adhesive retention properties even at temperatures as high as 100° C. although their highest adhesion retention properties hold only up to temperatures about as high as 50° C.

EXAMPLE 8

Compositions A & B of Example 7, Table IV, were used to laminate cotton duck to steel panels. The laminates were dried at room temperature for 24 hours and then immersed in water for 24 hours at 90° C. This run was carried out in order to test the effect of water immersion at elevated temperature. The samples were removed from the water, conditioned at room temperature for 4 hours, and tested. The Instron test for 180° peel adhesion was carried out at 2 inches per minute. The following results were obtained.

TABLE V

| Compound | A | B |
| --- | --- | --- |
| Sulfobutyl 1.5 mol %, fully neut. | 100 | 100 |
| Wingtack 95 Resin | 60 | — |
| Amberol ST-137X Resin | — | 60 |
| Solvent, Toluene/IPA, 90/10 | | |
| 180° Peel, lbs./in. Cotton Duck to Steel | | |
| Pulled at 22° C. (no water immersion) | 5 | 8 |
| Pulled at 22° C. (after water immersion - 24 hours at 90° C.) | 14 | 23 |

It can be seen from these data (Table V) that water immersion for 24 hours at 90° C. results in a greatly increased adhesion between the substrates.

Similarly, a conventional bake cycle greatly improves the adhesion properties of these cements when used to laminate cotton duck, (a porous material) to steel plates (a non-porous material). Table VI shows the same cements as adhesive layers (thickness of about 5 mils) between cotton duck cloth and steel sheeting. The Instron 180° peel adhesion test was conducted at room temperature at the rate of 2 inches per minute after the laminates had been subjected to a series of oven bake cycles at different times and temperatures.

As can be seen, the sulfobutyl cements of compositions A and B (Table VI) show a greatly improved adhesive strength after undergoing a bake cycle. When baked at a temperature of 150° C. for 1 hour, such a strong adhesion between the cotton duck cloth and the steel panel developed that failure was by reason of cotton duck cloth rupture and not at the adhesive layer interface between the steel panel and the cotton duck cloth. Comparative Example C (Table VI) shows that an ordinary high molecular weight butyl rubber cement shows some improved adhesion after a bake cycle but is still at a level substantially below that for the sulfobutyl cements.

TABLE VI

Cements applied to substrates, laminated, dried and then subjected to a bake cycle, as indicated, in a circulating air oven. Adhesion tested on an Instron at 2 in./min. at room temperature.

| Compound | A | B | C |
| --- | --- | --- | --- |
| Sulfobutyl, 1.5 mol.% $SO_3EA$ Fully neutralized | 100 | 100 | — |
| Butyl Rubber | — | — | 100 |
| Wingtack 95 Resin | 60 | — | 60 |
| Amberol ST-137X Resin | — | 60 | — |
| Solvent, Toluene/IPA, 90/10 | Yes | Yes | — |
| Solvent, Toluene, 100 | — | — | Yes |
| 180° Peel, lbs./in. Cotton Duck to Steel | | | |
| No bake cycle | 5 | 9 | 2 |
| After Bake Cycle of - | | | |
| 0.5 Hrs. at 70° C. | 7 | — | — |
| 1 Hr. at 70° C. | 12 | — | — |
| 3 Hrs. at 70° C. | 17 | — | 6 |
| 24 Hrs. at 70° C. | 38 | 22 | 13 |
| 3 Hrs. at 100° C. | 26 | 22 | — |
| 5 Min. at 120° C. | 8 | — | — |
| 15 Min. at 120° C. | 15 | — | 6 |
| 1 Hr. at 120° C. | 26 | 23 | 10 |
| 1 Hr. at 150° C. | 29 | 30 | — |

The T-peel test is carried out as described by the method designated in ASTM D-1876-69.

The 180° peel test is carried out as described by the method designated ASTM D-903-49 (reapproved 1965).

EXAMPLE 9

A butyl rubber cement 2108 grams (17.2 wt. % butyl rubber of Mv 350,000 in n-hexane) was placed in a 5 liter flask equipped with a stirrer and condenser. Acetyl sulfate in the amount of 15.2 cc was added and the reaction allowed to proceed for 30 minutes. The acetyl sulfate was prepared as shown in Example 1. Thereafter 45 grams of triethanol amine were added to fully neutralize the sulfobutyl reaction product (1.3 mole % $SO_3H$ groups) and the normal hexane was replaced with a like amount of a solution mixture of 90 parts toluene, and 10 parts isopropyl alcohol.

EXAMPLE 10

The same procedure was followed as in Example 9 except that the sulfonated butyl rubber cement (2737 grams) was prepared using 26.7 cc of acetyl sulfate to give a mole % sulfo groups incorporated in the butyl polymer in the amount of 1.6 mol % $SO_3H$. This material was fully neutralized with 34.6 grams of ethylamine.

EXAMPLE 11

The same procedure was followed as in Example 9 except that 9.75 cc of acetyl sulfate was employed to give a 0.9 mole % of sulfo groups in the sulfonated butyl rubber cement (2001 grams) and this was fully neutralized with 97.5 cc of 2N NaOH.

EXAMPLE 12

The neutralized polymer cement of Examples 9, 10 and 11 were each formulated with 45 phr of Schenectady SP-134 (an oil soluble, heat reactive, phenolic resin with a melting point of approximately 70° C.) and tested as adhesive bonding films. Aluminum to aluminum laminates were formed by placing the bonding film between plates of aluminum under about 150 psi pressure and a temperature of 125° C. for 30 minutes. The test specimens had a total bonded contact area of 2 square inches. The samples were then pulled on an Instron tester at a rate of 2 in./min. until rupture (Table VII). The force in pounds per square inch at rupture was measured.

The low temperature flexibility of these adhesive bonding films was also tested. The aluminum to aluminum laminate (as above described) were placed in a cold box (−15° C.) for 2 hours and tested in this environment by attempting to rupture the bond by hand flexing. The samples did not fail. (Table VII).

These data clearly demonstrate the good strength and good low temperature properties of adhesive bonding film formulated using sulfobutyl elastomers. More particularly, sulfobutyl rubber neutralized with a functional amine, i.e. triethanolamine, exhibits especially superior adhesive properties.

TABLE VII

| Polymers of | Example 9 | Example 10 | Example 11 |
| --- | --- | --- | --- |
| Schenectady SP 134 (phr) | 45 | 45 | 45 |
| Shear Strength psi at 23° C., 2 in/min. on an Instron tester | 450 | 350 | 200 |
| Bond Strength at low temperature (−15° C.) Hand Flex | — | Did not Fail | — |
| Brittle Point ° C. | −60 | −60 | −60 |

In general, the better adhesion of the sulfo elastomer to metal such as steel or aluminum was attained if the free acid or unneutralized form of the sulfo elastomer was used but for other substrates the partially and fully neutralized forms of the sulfo rubbers appeared to give higher adhesion strengths. To some extent, however, improved adhesion strengths were obtained using partially neutralized or fully neutralized sulfo rubbers adhered to smooth metal surfaces where after application of the sulfo rubber cement to the metal surface and the lamination thereof, the composite laminate was subjected to elevated temperatures of from about 70° C. for 24 hours to about 150° C. for 1 hour.

Having now thus fully described and illustrated the character and nature of this invention, what is desired to be secured by Letters Patent,

What is claimed is:

1. A liquid adhesive elastomeric contact cement composition consisting of a sulfo derivative of an olefinically unsaturated butyl rubber having a viscosity average molecular weight of about 100,000 to about 450,000 containing between about 0.1 and about 5.0 mole percent of sulfo groups, and, as a tackifier, between about 5 and about 90 parts by weight of at least one organo thermoplastic resin having a softening or melting point of above 50° C., per hundred parts by weight of butyl rubber, dissolved in an organic solvent or mixture of organic solvents, said cement composition containing about 10 to about 50 weight % solids, said solvent or solvents being sufficiently volatile to substantially all evaporate at ambient temperatures and pressures.

2. A cement composition as in claim 1 wherein the solvent is a mixture of solvents at least one of which is a polar solvent.

3. A cement composition as in claim 2 wherein the sulfobutyl rubber has an Mv of between about 300,000 and about 450,000 and the solvent is a mixture of solvents at least one of which is a polar solvent.

4. A cement composition as in claim 1 wherein the sulfo butyl rubber is at least partially neutralized with an organic amine or an inorganic base.

5. A cement composition as in claim 4 wherein the tackifier is a phenol formaldehyde resin.

6. A cement composition as in claim 4 wherein the tackifier is a petroleum hydrocarbon resin and the solvent is a mixture of toluene and isopropyl alcohol.

7. A cement composition as in claim 5 wherein the butyl rubber contains between about 0.05 and about 2.0 mol % sulfo groups, is fully neutralized with ethyl amine, and contains about 60 parts phr of a phenol formaldehyde resin tackifier.

* * * * *